United States Patent [19]

Jimenez

[11] Patent Number: 4,659,589

[45] Date of Patent: Apr. 21, 1987

[54] PROCESS FOR APPLYING A SEALING COMPOSITION

[75] Inventor: Rene C. Jimenez, Tampa, Fla.

[73] Assignee: Renbec International Corp., Tampa, Fla.

[21] Appl. No.: 747,326

[22] Filed: Jun. 21, 1985

[51] Int. Cl.⁴ ............................................. B32B 35/00
[52] U.S. Cl. .................................. 427/140; 427/142; 427/197; 427/202; 427/385.5
[58] Field of Search ............... 427/140, 142, 197, 199, 427/202, 205, 407.1, 409, 385.5, 388.1, 333, 340

[56] References Cited

U.S. PATENT DOCUMENTS

| | | | |
|---|---|---|---|
| 495,375 | 4/1893 | Savary | 427/202 |
| 3,019,127 | 1/1962 | Czerwonk et al. | 427/202 |
| 4,180,913 | 1/1980 | Takeuchi et al. | 428/404 |
| 4,182,823 | 1/1980 | Schoenberg | 428/500 |

FOREIGN PATENT DOCUMENTS 54-154502 12/1979 Japan .................................. 427/140

*Primary Examiner*—Sadie L. Childs
*Attorney, Agent, or Firm*—Walter J. Monacelli

[57] ABSTRACT

The invention described herein comprises a two component sealant composition and process for applying the same for repair of ruptures, holes, cracks, etc., in hoses, pipes, tires, etc. The first component is an alpha-cyanoacrylate glue which is applied as a layer covering the rupture or crack and after a very short period the second component, a powder, is applied to the surface of the alpha-cyanoacrylate. This second component comprises a polymerization initiator having hydroxyl and/or carboxylate groups therein, such as carbohydrates, i.e., saccharides, etc., hydrolyzed polyvinylacetate, etc. A particularly preferred initiator is alginate.

21 Claims, 3 Drawing Figures

PROCESS FOR APPLYING A SEALING COMPOSITION

FIELD OF THE INVENTION

This invention relates to a new sealant composition. More specifically it relates to a sealant composition which can be easily applied to seal punctures and ruptures in various materials and is cured in a short time to make a very effective seal. Still more specifically, this invention relates to the application of a cyanoacrylate to the puncture or rupture and shortly thereafter applying a material, preferably a powdered solid material having hydroxyl and/or carboxylate groups therein.

DESCRIPTION OF THE PRIOR ART

Anyone who has had an automobile radiator or heater hose rupture when some distance from a service station or when service stations are closed can appreciate the need and desirability of a sealant that can be easily and quickly applied to repair the rupture. Moreover there are any number of other types of ruptures, holes, cracks, etc. in various other articles that show a need for such a sealant.

Various compositions advertised as sealants for such purposes have proved very unsatisfactory. Even such products as the fast setting super glues, while very competent for adhering and gluing pieces together have not been found suitable as a sealant to repair ruptures, breaks and other types of openings in hoses, pipes, etc. Since the addition of activators and other materials which might have fast crosslinking and other hardening effects when incorporated within the cyanoacrylate would only serve to effect premature setting, this makes such additions highly impractical.

U.S. Pat. No. 3,836,377 describes the method of priming surfaces of pieces to improve adhesion by means of alpha-cyanoacrylate with compounds containing a

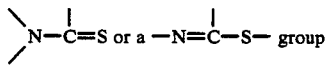

These dithiocarbamates, sulfenamides, etc. may also be incorporated directly into the cyanoacrylate to improve the cure. This latter fact shows these particular compounds cannot be as active as the accelerator or initiator of the present invention.

U.S. Pat. No. 4,180,913 describes a dental material comprising an alpha-cyanoacrylate containing as filler a silica power coated with a solid having a weak catalytic activity for the alpha-cyanoacrylate. After the composition is applied to the tooth a "setter" composition comprising a basic amine compound having a strong catalytic activity to the alpha-cyanoacrylate is applied to cure the dental material. The curing promoters or "setters" are tertiary amines such as N,N-dimethyl-p-toluidine, N,N-dimethylamiline, etc.

No systems have been found in which solid compounds containing hydroxyl or carboxylate groups initiate or activate cure from the outer surface of a cyanoacrylate layer.

SUMMARY OF THE INVENTION

In accordance with the present invention it has been found that a two component sealant for repairing ruptures, breaks, tears and other openings in various devices comprises a first component of an alpha-cyanoacrylate in which the acrylate ester group has 1-10 carbon atoms, and as a second component an initiator having hydroxyl and/or carboxylate groups therein. In applying the sealant to the rupture, etc., the cyanoacrylate is applied to the rupture, etc. and to an area around the rupture, preferably after the surrounding surface has been cleaned and dried by wiping or by other suitable means. After the cyanoacrylate has been allowed to set for a very short period sufficient of the activator, preferably in a powdered, solid condition, is applied over the surface of the cyanoacrylate, sufficient being used to cover the area above the rupture and the surrounding area.

While applicant does not wish to rely upon any particular mechanism or explanation of what reaction occurs during the hardening or sealing operation, it is believed that the activator or initiator promotes a chain reaction at the surface of the cyanoacrylate layer and the chain reaction proceeds downward through the thickness of the cyanoacrylate and effects hardening, possibly by further propagation of polymer molecules in the cyanoacrylate. In any case, the cyanoacrylate is hardened to effect the sealant function.

The accompanying drawings illustrate the manner in which the sealing power of the sealant of this invention can be tested.

Figure 1:
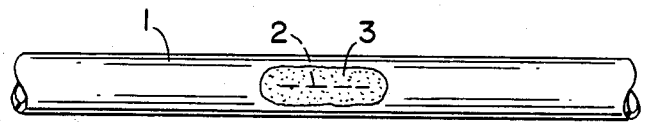
FIG. 1 shows a side elevational view of a section of hose or tubing which has a single slit parallel to the axis of the hose.

The initiators which are useful in the practice of this invention to effect curing through the layer of cyanoacrylate by external application to the surface of the cyanoacrylate include a wide variety of materials containing one or more hydroxyl and/or carboxylate groups. This material is preferably a powdered solid material so that it will stay positioned on the surface of the cyanoacrylate. Excess material may subsequently be brushed away after the curing or hardening is completed. This material may be diluted with an inert material, such as an inactive powder, provided the concentration of active material is sufficient to provide the desired curing activity.

Preferred materials include but are not limited to carbohydrates, particularly saccharides, namely monosaccharides and poly-saccharides and other monomeric and polymeric materials containing hydroxyl and/or carboxylate groups. Polysaccharides such as alginates, xanthan gum, cellulose, various types of starch including various typs of flour, guar gum, gum arabic, pectin, cellulose, Lambda carrageenan, locust bean gum, sucrose, heparin, glycogen, amylose, amylopectin, maltose, isomaltose, chitin, etc. Suitable monosaccharides include glucose, fructose, aldose, aldonic acid, aldaric acid, alditol, uronic acid, tartaric acid, glucosides, etc.

Suitable polymeric materials containing hydroxyl or carboxylate groups also include polyvinylalcohol, hydrolyzed polyvinylacetate advantageously containing less than 75% and preferably containing less than 25% acetate groups, phenol-formaldehyde polymers having methylol groups

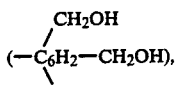

etc. Monomeric materials which are suitable include the dimethylol ethers of cyclohexane dimethanol and bisphenol, etc., metal salts, such as the sodium salts of fumaric acid, itaconic acid, succinic acid, lauric acid, oleic acid, benzoic acid, phenylacetic acid, cyclohexanecarboxylic acid, polymethacrylic acid, poly(acrylic acid), etc., monosodium salts, etc. of dibasic acids such as succinic acid, maleic acid, terephthalic acid, etc. The corresponding ammonium and substituted ammonium salts of these same acids are also suitable. Inorganic materials having hydroxyl or carboxylate groups such as diatomaceous earth are likewise suitable as initiators for the practice of this invetion.

The expression "carboxylate" is used herein to designate various metal and ammonium salts of carboxylic acids. While any convenient metal can be used, the preferred metals are alkali metal and alkaline earth metals, preferably sodium, potassium, lithium, calcium, magnesium, barium, etc. The ammonium salts include various substituted ammonium compounds, such as the trimethyl ammonium, dimethyl ammonium, monomethyl ammonium, triethyl ammonium, phenyl ammonium, diphenlyammonium, triphenyl ammonium, cyclohexyl ammonium, dicyclohexyl ammonium, etc. As will be noted from the above illustrative compounds, the hydroxyl group is attached to an aliphatic carbon atom.

The alpha-cyanoacrylates useful in the practice of this invention are preferably liquid monomers having the formula $H_2C=C(CN)-COOR$ wherein R is an aliphatic, aromatic (preferably benzoid aromatic) or cycloalphatic hydrocarbon, having from 1 to 10 carbon atoms, preferably alkyl, for example, methyl, ethyl, propyl, isopropyl, butyl, isobutyl, amyl, pentyl, hexyl, heptyl, ethylhexyl, octyl, nonyl and decyl. From among these, it is particularly advantageous to employ those wherein R is alkyl having from 1 to 6 carbon atoms, either straight or branched chain. The aromatic and cycloaliphatic groups may have substituent groups such as an alkyl having from 1 to 10 carbon atoms. The substituents are unlimited as long as the monomers are liquid. Illustrative substituents are lower alkoxy having from 1 to 4 carbon atoms [ethoxyethyl-alpha-cyanoacrylate] and halo, e.g., chloro and fluoro [trifluoro-isopropylalpha-cyanoacrylate]. In the trifluoro-isopropyl group the three fluorine atoms are preferably bonded to the same carbon atom. In addition, R can also be, for example, cyclohexyl, methylcyclohexyl, phenyl, tolyl, chlorophenyl, propargyl, butynyl, butenyl or allyl. The sole restrictions on R are that the monomer must be liquid at room temperature (20° C.) and atmospheric pressure and a carbon atom of R must be directly bound to the $H_2C=C(CN)-COO-$ group.

These alpha-cyanoacrylate monomers can contain any of the other compounding ingredients which are normally employed such as viscosity modifiers, coloring agents, fillers, pigments and the like.

Polymerization inhibitors such as sulfur dioxide may also be present. In lieu of sulfur dioxide other acidic inhibitors (against anionic polymerization), such as nitric oxide, nitrous oxide, carbon dioxide, p-toluene sulfonicacid, hydrogen fluoride, trichloroacetic acid and acetic anhydride, can be used to stabilize the monomer.

Carbon dioxide is recommended only for monomers wherein R has at least four carbon atoms. In combination with the acidic inhibitor a free radical inhibitor, such as hydroquinone, monomethylether of hydroquinone, picric acid and t-butyl-catechol, pyrocatechold, p-methoxyphenyl and the like, may be concurrently employed. The monomethylether of hydroquinone is the preferred stabilizer against free radical polymerization. Moreover, it imparts good color stability to both the monomeric alpha-cyanoacrylate and the polymerized product therefrom. Free radical inhibition may be obtained with 10 parts of the monomethylether of hydroquinone per million parts of 1-cyanoacrylic acid ester, in practice from 15 to 200 parts per million are employed.

The free radical polymerization inhibitor, like the anionic polymerization inhibitor, is normally added during the processing of the alpha-cyanoacrylate ester. Hence, a free radical polymerization inhibitor is generally introduced into the distillation vessel and the receiver to stabilize the ester in the synthesis thereof. As a result, commercially available alpha-cyanoacrylate esters may already contain a certain amount of a conventional free radical polymerization inhibitor such as those mentioned hereinabove.

There may also be present in the adhesive compositions of this invention various other optional ingredients including, for example, plasticizers and thickeners. Plasticizers improve the aging characteristics of the cured bonds by lessening the brittleness thereof. For the best performance the amount of plasticizer to be used should not exceed 20% by weight of the total composition. Suitable plasticizers include monofunctional and difunctional aliphatic esters of acids having 1 to 10 carbon atoms such as, for example, dimethyl octyl sebacate and esters of malonic acid, difunctional aromatic esters, phosphates and phosphonates. Thickeners, which may be used in amounts of up to 25% by weight, depending in part on their degree of fluidity at room temperature, serve to increase the viscosity of the adhesives so that they may be more easily applied. Among the suitable thickeners for this purpose are included, for example, polymeric alkyl alpha-cyanoacrylates, cellulose esters including cellulose acetate butyrate, acrylate resins such as poly(methyl methacrylate) and poly(ethyl methacrylate), and poly(vinyl alkyl ethers) such as poly(vinyl methyl ether).

SPECIFIC EMBODIMENT OF THE INVENTION

In order to perform various tests on the efficiency of the sealant composition of this invention, the equipment shown in the drawings is used.

FIG. 1 shows a section of garden hose. Hose 1 has a slit 2 having a slit length of 1 inch running parallel to the axis of the hose. This slit is covered with a layer of alpha-cyanoacrylate 3 (commercial type Super Glue as marketed by Super Glue Corp.) with the layer of glue extending over an area of the tube adjacent to the slit.

Figure 2:
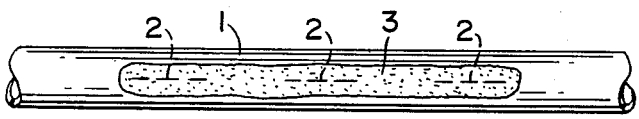
FIG. 2 shows a side elevational view of another section of hose or tubing with three slits parallel to the axis of the hose.

FIG. 2 shows a section of Neoprene rubber hose having three such slits 1 with a spacing of 1 inch between adjacent slits in the tube with a layer of alpha-cyanoacrylate 3 covering the three slits and adjacent area.

Figure 3:
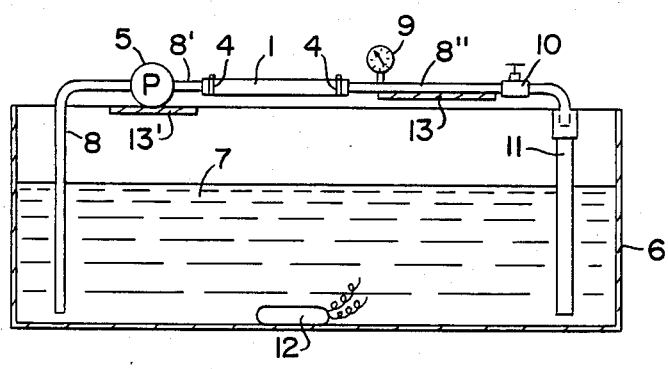
FIG. 3 is a schematic view of equipment for controlling the pressure and temperature for sealant testing.

FIG. 3 shows equipment for testing such tubing on which the layer has been cured by covering the alpha-cyanoacrylate layer with the powdered initiator (not shown) to effect curing and hardening of the cyanoacrylate to function as a sealant. Tank 6 is more than half filled with water 7. Pump 5 positioned between pipe or tubing 8 and pipe or tubing 8' is supported by plate 13'. Hose 1 is fastened by clamps 4 to join pipe 8' with pipe 8" which latter pipe is supported on plate 13. Plates 13 and 13' rest on supporting means which are not shown. Valve 10 is positioned on pipe 8" to control the flow of water therethrough. Catch pipe 11 catches water flowing out of pipe 8" and returns it to tank 6. Heater 12 is used to heat the water to desired temperatures so that the repaired hose can be operated under temperature and pressure conditions that the hose may be exposed to in actual use.

EXAMPLE I

The radiator hose of a 1970 Dodge automobile is punched with a ⅛ inch awl to make an opening therein. This opening and the surrounding area are covered with an alpha-cyanoacrylate (Super Glue) and then a layer of dental alginate is applied over the Super Glue layer. Then the automobile is operated under normal conditions with the water temperature at 130° C. After 15 hours the radiator hose is still operating satisfactorily. These results are tabulated below in Table I.

TABLE I

| Curing Agent | Maximum Applied Pressure | Water Temp. °C. | Test Period | Remarks |
|---|---|---|---|---|
| Alginate | 16 psi | 130 | >15 hrs. | Radiator hose on car |

EXAMPLE II

In a first test a hole is punched into a Neoprene fuel line hose of ⅜ inch inside diameter with a ⅛ inch awl. An alpha-cyanoacrylate (Super Glue) is applied over the hole so as to cover an area extending at least ¼ inch in all directions beyond the hole. The curing agent (initiator) is applied immediately to cover the entire surface of the cyanoacrylate. The conditions of testing and the results are given below in Table II. In order to raise the hose to the desire temperature the water in the tank 6 is heated to the desired temperature and pumped through hose 1 until well heated. Then valve 10 is partially closed to maintain the desired pressure.

TABLE II

| Curing Agent | Maximum Applied Pressure | Water Temp. °C. | Failure* Time | Remarks |
|---|---|---|---|---|
| Pectin (citrus) | 60 psi | 100 | >15 min.* | Slow cure (5 min.) |
| Oxidized corn starch | 60 psi | 100 | >15 min. | |
| Lambda Carrageenan | 50 psi | 90 | >15 min. | Rapid cure |
| Lambda Carrageenan | 45 psi | 25 | >15 min. | Rapid cure |
| Pillsbury all purpose flour | 20 psi | 25 | >15 min. | |
| Acid Converted Starch | 20 psi | 25 | >15 min. | Slow cure (5 min.) |

*> This designation means that the test was successfully operated for 15 minutes and then the test was discontinued.

EXAMPLE III

In a vinyl garden hose of ⅜ inch inside diameter a single slit one inch long is cut as shown in FIG. 1. This slit together with the adjacent area extending about ¼ inch in all directions around the slit is covered with a layer of alpha-cyanoacrylate (Super Glue). Shortly thereafter the powdered activator is applied to cover completely the layer of cyanoacrylate. Then after about 5 minutes of curing, tests as described above in Example II are performed with the water at about 23° C. and about 60 psi. The specific curing agents, conditions and duration of tests are reported below in Table III.

TABLE III

| Curing Agent | Maximum Applied Pressure | Water Temp. °C. | Failure Time (min.) | Remarks |
|---|---|---|---|---|
| Lambda Carrangeenan | 60 psi | 23 | >15* | |
| Pectin (citrus) | 60 psi | 23 | >15 | Requires 3 min. to cure |
| Locust bean gum | 60 psi | 23 | >15 | |
| Alginate | 60 psi | 23 | >15 | |
| Xanthum gum | 60 psi | 23 | >15 | |

*The designation >15 means that there is no failure and the test is discontinued after 15 minutes.

EXAMPLE IV

In a Neoprene fuel line hose having an inside diameter of ⅜ inch, three slits each one inch long and one inch apart as shown in FIG. 2 are cut into the hose as shown in FIG. 2. These slits together with the adjacent area extending about at least ¼ inch in all directions around the slits, is covered with a layer of alpha-cyanoacrylate (Super Glue). Shortly thereafter the powdered activator is applied to cover completely the layer of Super Glue. Then after at least 5 minutes of curing, tests are performed as described in Example II with the water at about 22° C. and about 50 psi pressure. The specific curing agent, the pressure applied, the water temperature and duration of tests are reported below in Table IV.

TABLE IV

| Curing Agent | Maximum Applied Pressure | Water Temp. °C. | Failure Time (min.) | Remarks |
|---|---|---|---|---|
| Control* | 50 psi | 22 | 5 | Cure time 30 min. |
| Alginate | 50 psi | 22 | >15** | |
| Xanthate gum | 50 psi | 22 | >15 | |
| Lambda Carr a geenan<sup>a</sup> | 50 psi | 22 | >15 | |
| Dextran | 50 psi | 22 | >15 | Slow cure 5 min. |
| Cellulose (100 micro fibers) | 50 psi | 22 | >15 | Slow cure 5 min. |
| Diatomaceous earth | 50 psi | 22 | >15 | |
| Pectin (citrus) | 50 psi | 22 | >15 | |
| Guar Gum | 50 psi | 22 | >15 | |
| Gum arabic<sup>b</sup> | 50 psi | 22 | >15 | Slow cure |
| Na bicarb | 50 psi | 23 | >15 | Very sensitive to cracking |
| PVA-12 | 50 psi | 23 | >15 | Ruptured when raised to 80 psi |
| PVA-25 | 50–80 psi | 23 | >15 | |
| Oxidized Corn starch*** | 50 psi | 22 | >15 | Slow cure |
| Oxidized Corn starch*** | 50 psi | 22 | 1 | Slow cure |
| Oxidized | 50 psi | 22 | 1 | Slow cure |

TABLE IV-continued

| Curing Agent | Maximum Applied Pressure | Water Temp. °C. | Failure Time (min.) | Remarks |
|---|---|---|---|---|
| Corn starch*** | | | | |

*Control is run only with cyanoacrylate layer and no powder applied.
**The designation 15 means that there is no failure and the test is discontinued after 15 minutes.
<sup>a</sup>Average of 6 runs with only one failure.
<sup>b</sup>Average of 3 runs. Soaking time 2-3 minutes unless otherwise indicated.
***Oxidized corn starch is a mixture of amylose and amylpectin which has been treated with NaOCl at pH 8-10 at 21-38° C. This oxidizes a number of the OH groups to aldehyde, ketone and COOH groups with concomitant cleavage of the glucoside bonds. Apparently this has a deleterious effect since only one out of three of these tests is successful. However in Example II this same material is used successfully with a smaller opening.

EXAMPLE V

The procedure of Example IV is repeated except that during the testing the water temperature is raised to 90° C. and the hose is raised to approximately that temperature. After applying the alpha-cyanoacrylate over the slits and at least ½ inch in each direction beyond the slits, the powder is applied over the layer of acrylate and allowed to cure for at least 5 minutes before testing. The specific powder, the conditions and the results are reported below in Table V.

TABLE V

| Curing Agent | Maximum Applied Pressure | Water Temp. °C. | Failure Time (min.) | Remarks |
|---|---|---|---|---|
| Alginate* | 16 psi | 90 | >15** | |
| Lambda Carrageenan | 16 psi | 90 | >15 | |
| Lambda Carrageenan | 45 psi | 90 | — | Hose begins to balloon |
| Dextran | 16 psi | 90 | 5 | |
| Dextran | 20 psi | 90 | — | One rupture*** |
| Dextran | 30 psi | 90 | — | One rupture*** |
| Dextran | 50 psi | 90 | — | All three rupture |
| Diatomaceous earth | 16 psi | 90 | >15 | |
| Guar Gum | 16 psi | 90 | >15 | |
| Gum arabic | 16 psi | 90 | >15 | |
| PVA-25 | 35 psi | 90 | | 2 out of 3 rupture |
| Pectin (citrus) | 16 psi | 90 | >15 | Slow cure 5 min. |

*Dental type alginate
**The designation 15 means there is no failure and the test is discontinued after 15 minutes.
***One slit ruptured immediately - other two held. Example IV shows that dextran is much more effective with water temperature at 22° C. even with 50 psi.

EXAMPLE VI

The procedure of Example IV is repeated using "Tygon" tubing having an inside diameter of ⅜ inch (Tygon is the registered trademark of Goodrich Chemical Company for its polyvinylchloride tubing).

| Curing Agent | Maximum Applied Pressure | Water Temp. °C. | Failure Time (Min.) |
|---|---|---|---|
| Locust Bean Gum | 80 psi | 23 | 15 |

EXAMPLE VII

A chromium plated copper tube having an inside diameter of ⅜ inch has a 3/32 inch hole drilled therein. This hole is covered with Super Glue and then with alginate as described above following which testing in the equipment of FIG. IV shows that the sealant withstands a pressure of 100 psi at 23° C. for 15 minutes.

EXAMPLE VIII

The procedure of Example II is repeated a number of times with similar successful results using as the alpha-cyanoacrylate the following respectively:
(a) A 50-50 mixture of methyl and ethyl alpha-cyanoacrylate;
(b) Butyl alpha-cyanoacrylate;
(c) Hexyl alpha-cyanoacrylate;
(d) Phenyl alpha-cyanoacrylate; and
(e) Cyclohexyl alpha-cyanoacrylate.

EXAMPLE IX

The procedure of Example II is repeated a number of times with similar successful results using the following respectively as the initiator:
(a) Polyacrylic acid with 2.5 percent of the carboxylic acid groups neutralized with NaOH.
(b) Polymethacrylic acid with 15 percent of the carboxylic acid groups neutralized with KOH.
(c) Monosodium salt of succinic acid.
(d) Disodium salt of maleic acid.
(e) Monammonium salt of fumaric acid.
(f) Di(trimethylammonium) salt of terephthalic acid.

The sealant of this invention can be used to seal openings or ruptures in any type of material. The only requirement is that the alpha-cyanoacrylate adheres effectively to the material.

The initiator material may be used in various mixtures with each other or with inert materials provided there is at least 25%, preferably at least 50% of the active ingredient. The balance can be of various inert fillers or less active materials such as finely divided silica, graphite, etc.

While certain features of this invention have been described in detail with respect to various embodiments thereof, it will of course be apparent that other modifications can be mde within the spirit and scope of this invention and it is not intended to limit the invention to the exact details shown above except insofar as they are defined in the following claims.

The invention claimed is:

1. A process for applying a sealant comprising the steps of:
(a) applying a layer of an alpha-cyanoacrylate over the rupture or opening to be sealed and over the area adjacent to said rupture or opening, said alpha-cyanoacrylate being liquid at 20° C. and having the formula $CH_2=C(CN)—COOR$ wherein R is a hydrocarbon radical selected from the group consisting of aliphatic, aromatic and cycloaliphtic hydrocarbon groups of 1-10 carbon atoms and alkoxy, chloro and fluoro derivatives of said hydrocarbon groups in which alkoxy groups there are 1-4 carbon atoms therein; and
(b) spreading on the said layer of alpha-cyanoacrylate a layer of a powdered solid having hydroxyl, carboxylate or both hydroxyl and carboxylate groups therein.

2. The process of claim 1 in which said R group is an alkyl group of 1-6 carbon atoms.

3. The process of claim 2 in which said powdered solid is a carbohydrate.

4. The process of claim 2 in which said powdered solid is a saccharide.

5. The process of claim 4 in which said saccharide is a monosaccharide.

6. The process of claim 4 in which said saccharide is a polysaccharide.

7. The process of claim 6 in which said polysaccharide is an alginate.

8. The process of claim 6 in which said polysaccharide is a starch.

9. The process of claim 6 in which said polysaccharide is pectin.

10. The process of claim 6 in which said polysaccharide is carrageenan.

11. The process of claim 6 in which said polysaccharide is locust bean gum.

12. The process of claim 1 in which said powdered solid is selected from the group consisting of alginate, pectin, starch, cellulose, locust bean gum, xanthate gum, dextran, guar gum, gum arabic, Na bicarbonate, polyvinylalcohol, a vinylalcohlol-vinylacetate copolymer having at least 25% vinylalcohol groups therein, sodium bicarbonate, a sodium salt of polyacrylic acid, a sodium salt of polymethacrylic acid, an ammonium salt of polyacrylic acid and an ammonium salt of polymethacrylic acid.

13. The process of claim 12 in which said alpha-cyanoacrylate is the methyl ester.

14. The process of claim 12 in which said alpha-cyanoacrylate is the ethyl ester.

15. The process of claim 12 in which said alpha-cyanoacrylate is a mixture of the methyl and ethyl esters.

16. The process of claim 12 in which said alpha-cyanoacrylate is a butyl ester.

17. The process of claim 12 in which said alpha-cyanoacrylate is a propyl ester.

18. The process of claim 1 in which said alpha-cyanoacrylate contains a polymerization inhibitor.

19. The process of claim 18 in which said inhibitor is sulfur dioxide.

20. The process of claim 1 in which said alpha-cyanoacrylate contains a filler.

21. The process of claim 20 in which said filler is silica.

* * * * *